United States Patent
Bordeianu et al.

(10) Patent No.: US 9,364,900 B2
(45) Date of Patent: *Jun. 14, 2016

(54) LOCKING CHUCK

(71) Applicant: Apex Brands, Inc., Sparks, MD (US)

(72) Inventors: Eugen A. Bordeianu, Clemson, SC (US); Michael C. Goodson, Anderson, SC (US); Allan R. Grovo, Walhalla, SC (US); Thomas E. Warner, Seneca, SC (US)

(73) Assignee: APEX BRANDS, INC., Apex, NC (US)

( * ) Notice: Subject to any disclaimer, the term of this patent is extended or adjusted under 35 U.S.C. 154(b) by 102 days.

This patent is subject to a terminal disclaimer.

(21) Appl. No.: 14/223,247

(22) Filed: Mar. 24, 2014

(65) Prior Publication Data

US 2014/0203525 A1 Jul. 24, 2014

Related U.S. Application Data

(63) Continuation of application No. 13/706,524, filed on Dec. 6, 2012, now Pat. No. 8,678,400, which is a continuation of application No. 13/186,296, filed on Jul. 19, 2011, now Pat. No. 8,328,205, which is a (Continued)

(51) Int. Cl.
B23B 31/12 (2006.01)

(52) U.S. Cl.
CPC ........... B23B 31/123 (2013.01); B23B 31/1238 (2013.01); B23B 2231/38 (2013.01);

(Continued)

(58) Field of Classification Search
CPC .............. B23B 31/123; B23B 31/1238; B23B 2231/38

USPC ..................... 279/60–65, 140, 902
See application file for complete search history.

(56) References Cited

U.S. PATENT DOCUMENTS

| 573,189 A | 12/1896 | Vogel |
| 4,213,623 A | 7/1980 | Rohm |

(Continued)

FOREIGN PATENT DOCUMENTS

| DE | 4238503 C1 | 11/1993 |
| DE | 19506708 C1 | 3/1996 |

(Continued)

OTHER PUBLICATIONS

International Preliminary Search Report for PCT/US2006/019419, dated Mar. 19, 2009.

(Continued)

*Primary Examiner* — Eric A Gates
(74) *Attorney, Agent, or Firm* — Nelson Mullins Riley & Scarborough LLP

(57) ABSTRACT

A chuck including a body with a nose section defining an axial bore formed therein, a plurality of jaws movably disposed with respect to the body, and a sleeve rotatably mounted about the body so that rotation of the sleeve moves the jaws relative to the axial bore. A bearing has a first race, a second race, and at least one bearing element disposed therebetween, one of the first race and the second race defining a ratchet and the other defining a pawl biased toward the ratchet. A biasing element is disposed between the pawl and the sleeve. The biasing element exerts a biasing force on the pawl toward the ratchet and the ratchet and the pawl prevent the second race from rotating in the opening direction with respect to the first race when engaged.

21 Claims, 8 Drawing Sheets

Related U.S. Application Data continuation of application No. 12/772,413, filed on May 3, 2010, now Pat. No. 7,984,913, which is a continuation of application No. 11/435,405, filed on May 17, 2006, now Pat. No. 7,708,288.

(60) Provisional application No. 60/682,615, filed on May 18, 2005.

(52) U.S. Cl.
CPC ........ *B23B2260/008* (2013.01); *Y10S 279/902* (2013.01); *Y10T 279/17615* (2015.01); *Y10T 279/17632* (2015.01); *Y10T 279/32* (2015.01)

(56) References Cited

U.S. PATENT DOCUMENTS

| | | | |
|---|---|---|---|
| 4,302,021 A | 11/1981 | Rohm |
| 4,583,751 A | 4/1986 | Rohm |
| 4,840,387 A | 6/1989 | McCarthy |
| 5,014,143 A | 5/1991 | Mori et al. |
| 5,044,643 A | 9/1991 | Nakamura |
| 5,125,673 A | 6/1992 | Huff et al. |
| 5,145,192 A | 9/1992 | Rohm |
| 5,145,193 A | 9/1992 | Rohm |
| 5,172,923 A | 12/1992 | Nakamura |
| 5,193,824 A | 3/1993 | Salpaka |
| 5,215,317 A | 6/1993 | Jordan et al. |
| 5,232,230 A | 8/1993 | Lin |
| 5,234,223 A | 8/1993 | Sakamaki |
| 5,261,679 A | 11/1993 | Nakamura |
| 5,322,303 A | 6/1994 | Nakamura |
| 5,348,317 A | 9/1994 | Steadings et al. |
| 5,348,318 A | 9/1994 | Steadings et al. |
| 5,411,275 A | 5/1995 | Huff et al. |
| 5,431,419 A | 7/1995 | Mack |
| 5,458,345 A | 10/1995 | Amyot |
| 5,499,829 A | 3/1996 | Rohm |
| 5,499,830 A | 3/1996 | Schnizler |
| 5,501,473 A | 3/1996 | Barton et al. |
| 5,615,899 A | 4/1997 | Sakamaki |
| 5,741,016 A | 4/1998 | Barton et al. |
| 5,775,704 A | 7/1998 | Wilson et al. |
| 5,816,582 A | 10/1998 | Steadings et al. |
| 5,816,583 A | 10/1998 | Middleton |
| 5,826,888 A | 10/1998 | Weaver et al. |
| 5,829,761 A | 11/1998 | Rohm |
| 5,882,153 A | 3/1999 | Mack et al. |
| 5,913,524 A | 6/1999 | Barton |
| 5,957,469 A | 9/1999 | Miles et al. |
| 6,260,856 B1 | 7/2001 | Temple-Wilson |
| 6,390,481 B1 | 5/2002 | Nakamuro |
| 6,502,836 B1 | 1/2003 | Marriott |
| 6,554,289 B1 | 4/2003 | Lin |
| 6,572,310 B2 | 6/2003 | Temple-Wilson |
| 6,581,942 B2 | 6/2003 | Rohm |
| 6,659,474 B2 | 12/2003 | Sakamaki et al. |
| 6,824,141 B1 | 11/2004 | Sakamaki et al. |
| 6,843,485 B2 | 1/2005 | Sakamaki et al. |
| 6,902,171 B2 | 6/2005 | Sakamaki et al. |
| 7,185,895 B2 | 3/2007 | Cachod et al. |
| 7,296,803 B2 | 11/2007 | Yang et al. |
| 7,360,770 B2 | 4/2008 | Luckenbaugh et al. |
| 7,451,990 B2 | 11/2008 | Young |
| 7,472,913 B2 | 1/2009 | Gong et al. |
| 7,497,444 B2 | 3/2009 | Sakamaki et al. |
| 7,527,273 B2 | 5/2009 | Bordeianu |
| 7,845,651 B2 | 12/2010 | Yaksich |
| 7,900,937 B2 | 3/2011 | Yaksich |
| 2005/0087937 A1 | 4/2005 | Zhou |
| 2008/0042375 A1 | 2/2008 | Yaksich |
| 2009/0045594 A1 | 2/2009 | Yaksich |
| 2012/0126495 A1 | 5/2012 | Garber et al. |

FOREIGN PATENT DOCUMENTS

| | | |
|---|---|---|
| DE | 29600727 U1 | 3/1996 |
| DE | 4438991 A1 | 5/1996 |
| EP | 0618029 A1 | 10/1994 |
| EP | 0677348 A1 | 10/1995 |
| EP | 0710518 A2 | 5/1996 |
| EP | 0710519 A2 | 5/1996 |
| EP | 0710520 A2 | 5/1996 |
| EP | 0519412 B1 | 3/1997 |
| EP | 0785041 B1 | 2/2001 |
| FR | 2645056 A1 | 10/1990 |
| JP | 4365504 A | 12/1992 |

OTHER PUBLICATIONS

European Search Report dated Sep. 29, 2009, for co-pending European Patent Application No. EP 06 760 169.0 filed on May 18, 2006.

Fig. 7

LOCKING CHUCK

This application is a continuation of U.S. patent application Ser. No. 13/706,524, filed Dec. 6, 2012, now U.S. Pat. No. 8,678,400, which is a continuation of U.S. patent application Ser. No. 13/186,296, filed Jul. 19, 2011, now U.S. Pat. No. 8,328,205, which is a continuation of U.S. patent application Ser. No. 12/772,413, filed May 3, 2010, now U.S. Pat. No. 7,984,913, which is a continuation of U.S. patent application Ser. No. 11/435,405, filed May 17, 2006, entitled "Locking Chuck," now U.S. Pat. No. 7,708,288, which claims priority to U.S. Provisional Application No. 60/682,615, filed May 18, 2005, the entire disclosures of which are incorporated by reference herein.

BACKGROUND OF THE INVENTION

The present invention relates generally to chucks for use with drills or with electric or pneumatic power drivers. More particularly, the present invention relates to a chuck of the keyless type which may be tightened or loosened by hand or actuation of the driver motor.

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways constrain three jaws which are movable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached onto the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Examples of such chucks are disclosed in U.S. Pat. Nos. 5,125,673 and 5,193,824, the entire disclosures of which are incorporated by reference herein. Various configurations of keyless chucks are known in the art and are desirable for a variety of applications.

SUMMARY OF THE INVENTION

The present invention recognizes and addresses the foregoing considerations, and others, of prior art constructions and methods.

An embodiment of the present invention includes a chuck for use with a manual or powered driver having a rotatable drive shaft. The chuck includes a generally cylindrical body having a nose section and a tail section, the tail section being configured to rotate with the drive shaft and the nose section having an axial bore formed therein. A plurality of jaws are movably disposed with respect to said body in communication with said axial bore. A sleeve is rotatably mounted about the body in operative communication with the jaws so that rotation of the sleeve in a closing direction moves the jaws toward a longitudinal axis of the axial bore and rotation of the sleeve in an opening direction moves the jaws away from the longitudinal axis. A bearing has a first race adjacent the body, a second race adjacent the sleeve and at least one bearing element disposed between the first race and the second race. One of the first race and the second race define a ratchet and the other of the first race and the second race defines a pawl biased toward the ratchet, and a biasing element disposed between the pawl and the sleeve. The biasing element exerts a biasing force on said pawl toward said ratchet and wherein said ratchet and said pawl are configured so that when said pawl engages said ratchet, said ratchet and pawl prevent said second race from rotating in said opening direction with respect to said first race.

Another embodiment of the invention provides a chuck for use with a manual or powered driver having a rotatable drive shaft. The chuck includes a generally cylindrical body having a nose section and a tail section, the tail section being configured to rotate with the drive shaft and the nose section having an axial bore formed therein. A plurality of passageways are formed therethrough and intersect the axial bore. A plurality of jaws are movably disposed in said passageways. A generally cylindrical first sleeve is rotatably mounted about the body and in operative communication with the jaws so that rotation of the first sleeve in a closing direction moves the jaws toward a longitudinal axis of the axial bore and rotation of the first sleeve in an opening direction moves the jaws away from the longitudinal axis. A bearing has a first race adjacent the body, a second race adjacent the first sleeve and a plurality of bearing elements disposed between the first race and the second race. The first race defines a ratchet, the second race defines a deflectable first pawl biased toward the ratchet, the ratchet and the first pawl being configured so that when the first pawl engages the ratchet, the ratchet and first pawl permit the second race to rotate in the closing direction with respect to the first race but prevent the second race from rotating in the opening direction with respect to the first race. A biasing element is disposed between the second race and the first sleeve, and the biasing element is configured to bias the first pawl toward said ratchet.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which:

FIG. 7 is a longitudinal view, in section, of a chuck as shown in FIG. 6; and

Figure 1:
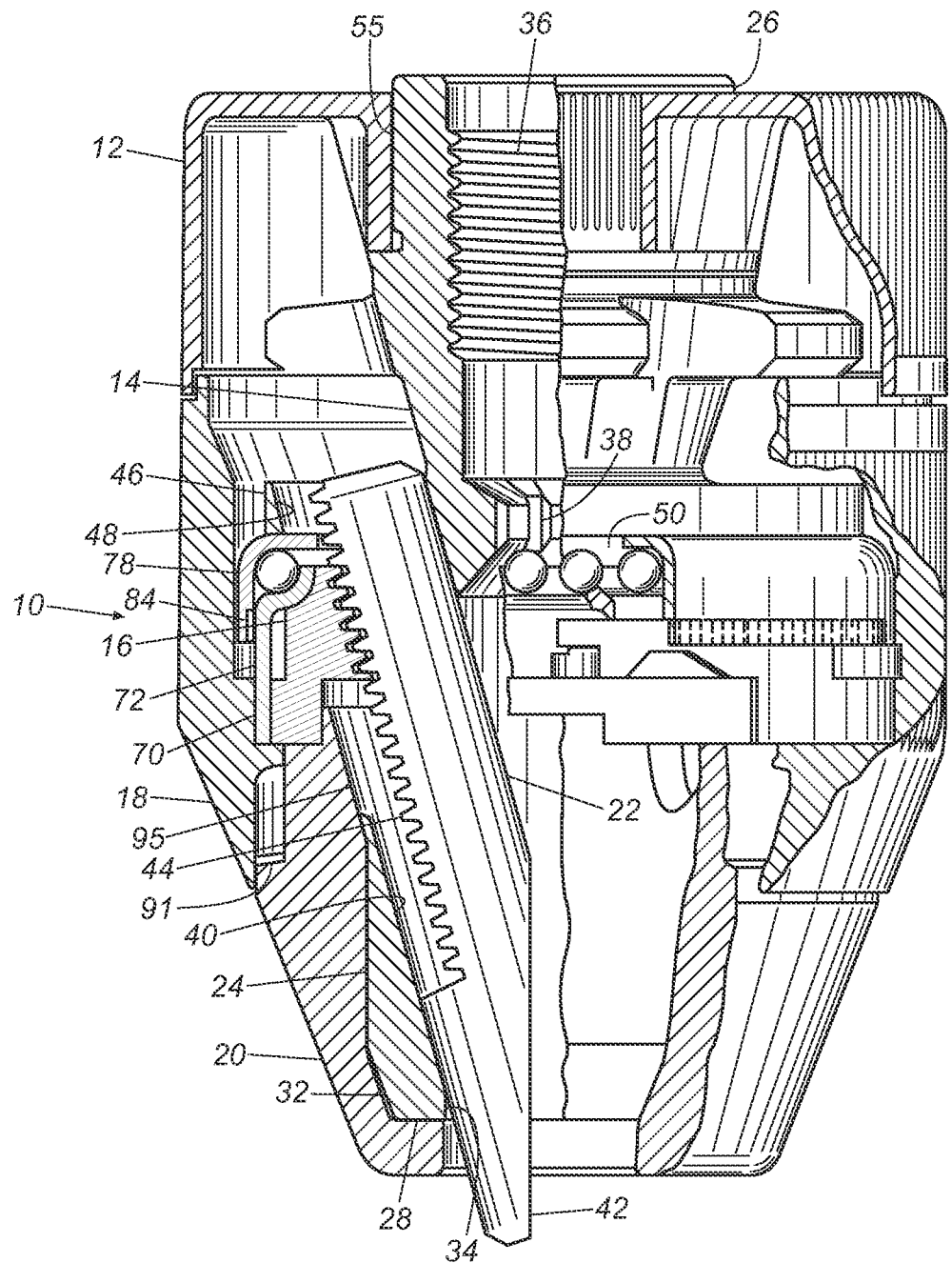
FIG. 1 is a longitudinal view, partly in section, of a prior art chuck.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure.

Figure 2:
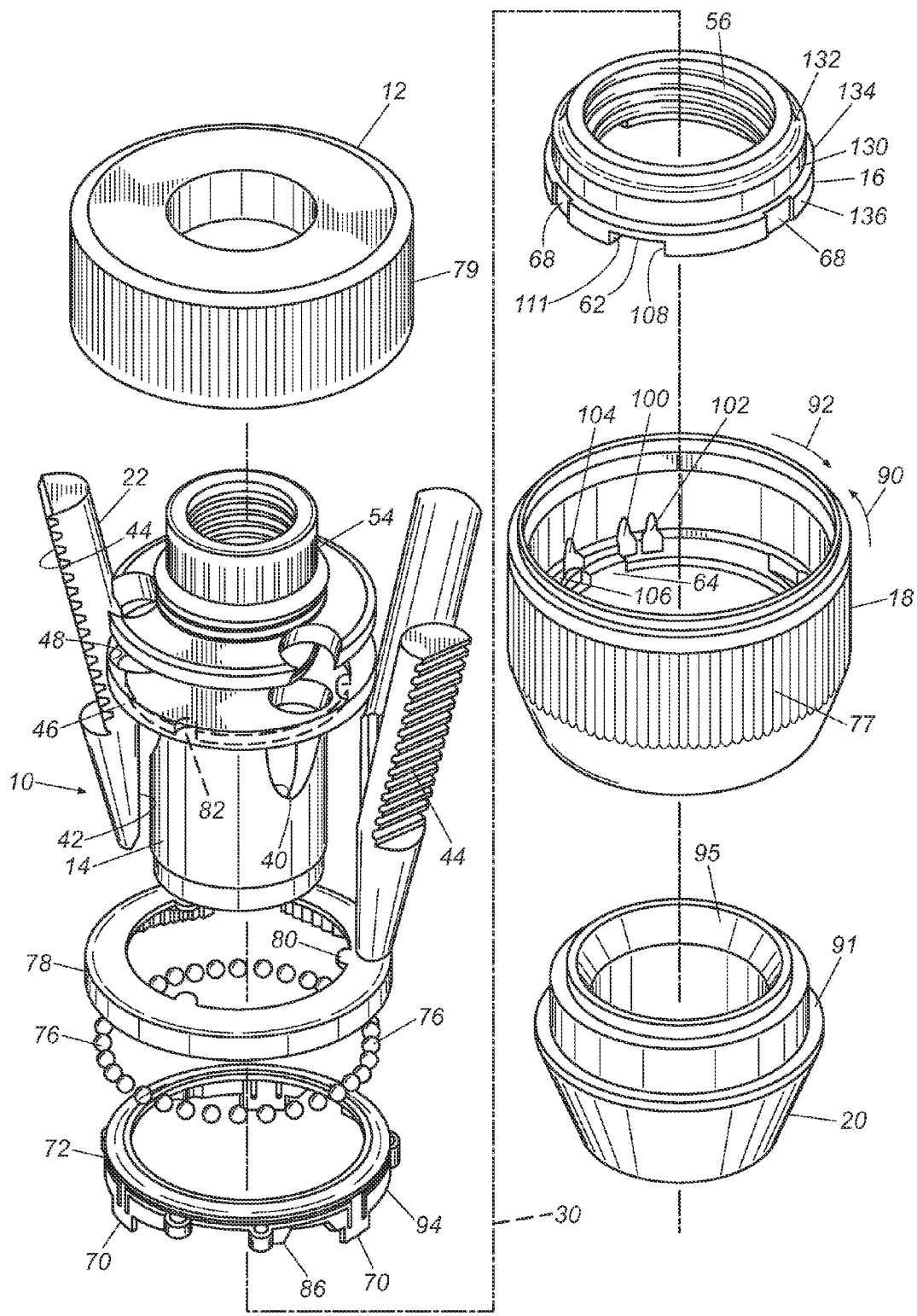
FIG. 2 is an exploded view of a chuck as shown in FIG. 1.

Referring to FIGS. 1 and 2, a prior art chuck 10 includes a body 14, a nut 16, a front sleeve 18, a nose piece 20 and a plurality of jaws 22. Body 14 is generally cylindrical in shape and comprises a nose or forward section 24 and a tail or rearward section 26. Nose section 24 has a front face 28 transverse to the longitudinal center axis 30 of body 14 and a tapered surface 32 at its forward end. The nose section defines an axial bore 34 that is dimensioned somewhat larger than the largest tool shank that the tool is designed to accommodate. A threaded bore 36 is formed in tail section 26 and is of a standard size to mate with the drive shaft of a powered or hand driver (not shown). The bores 34, 36 may communicate at a central region 38 of body 14. While a threaded bore 36 is illustrated, such bore could be replaced with a tapered bore of a standard size to mate with a tapered drive shaft. Furthermore, body 14 may be formed integrally with the drive shaft.

Figure 5:
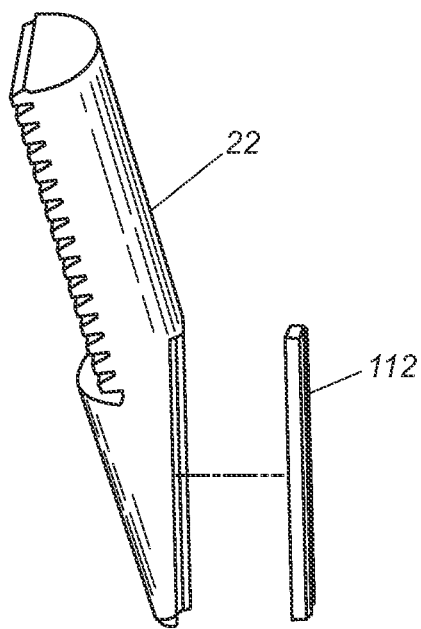
FIG. 5 is a perspective view of a chuck jaw of the chuck as shown in FIG. 1.

Body 14 defines three passageways 40 to accommodate the three jaws. Each jaw is separated from the adjacent jaw by an arc of approximately 120°. The axes of passageways 40 and jaws 22 are angled with respect to the chuck center axis 30 such that each passageway axis travels through axial bore 34 and intersects axis 30 at a common point ahead of the chuck body. The jaws form a grip that moves radially toward and away from the chuck axis to grip a tool, and each jaw 22 has a tool engaging face 42 generally parallel to the axis of chuck body 14. Threads 44, formed on the jaw's opposite or outer surface, may be constructed in any suitable type and pitch. As shown in FIG. 5, each jaw 22 may be formed with a carbide insert 112 pressed into its tool engaging surface.

As illustrated in FIGS. 1 and 2, body 14 includes a thrust ring 46 that, preferably, may be integral with the body. It should be understood, however, that thrust ring 46 and body 14 may be separate components. Thrust ring 46 includes a plurality of jaw guideways 48 formed around its circumference to permit retraction of jaws 22 therethrough and also includes a ledge portion 50 to receive a bearing assembly as described below.

Body tail section 26 includes a knurled surface 54 that receives an optional rear sleeve 12 in a press fit at 55. Rear sleeve 12 could also be retained by press fit without knurling, by use of a key or by crimping, staking, riveting, threading or any other suitable securing mechanism. Further, the chuck may be constructed with a single sleeve having no rear sleeve.

Nose piece 20 retains nut 16 against forward axial movement. The nose piece is press fit to body nose section 24. It should be understood, however, that other methods of axially securing the nut on the body may be used. For example, the nut may be a two-piece nut held on the body within a circumferential groove on the outer circumference of the body. Nose piece 20 may be coated with a non-ferrous metallic coating to prevent rust and to enhance its appearance. Examples of suitable coatings include zinc or nickel, although it should be appreciated that any suitable coating could be utilized.

The outer circumferential surface of front sleeve 18 may be knurled or may be provided with longitudinal ribs 77 or other protrusions to enable the operator to grip it securely. In like manner, the circumferential surface of rear sleeve 12, if employed, may be knurled or ribbed as at 79 if desired.

Front sleeve 18 is secured from movement in the forward axial direction by an annular shoulder 91 on nose piece 20. A frustoconical section 95 at the rearward end of the nose piece facilitates movement of jaws 22 within the chuck.

The front and rear sleeves may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials from which the chuck is fabricated will depend on the end use of the chuck.

Nut 16 has threads 56 for mating with jaw threads 44. Nut 16 is positioned about the body in engagement with the jaw threads so that when the nut is rotated with respect to body 14, the jaws will be advanced or retracted depending on the nut's rotational direction.

Figure 3:
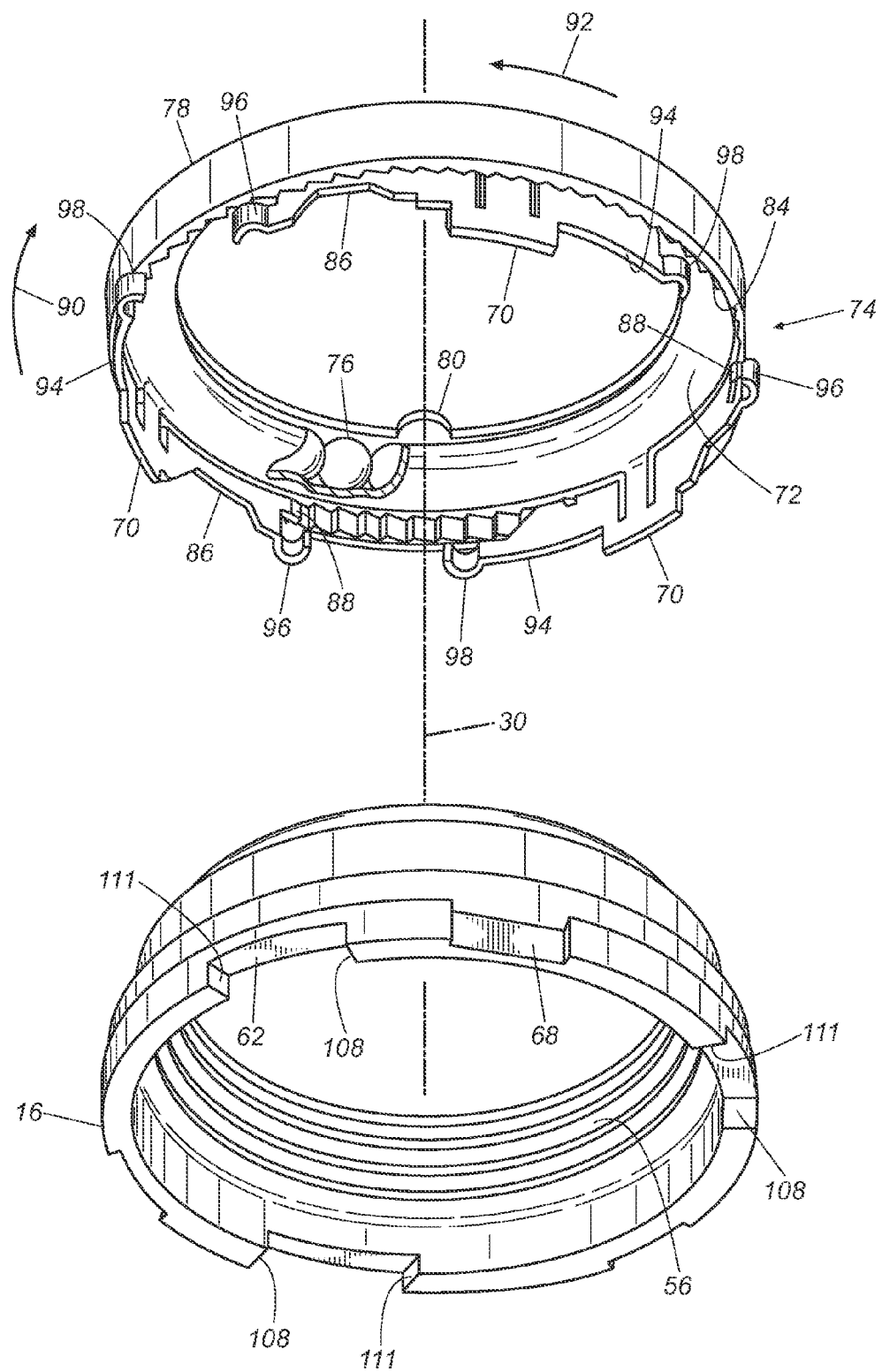
FIG. 3 is an exploded view of the bearing and nut of the chuck as shown in FIG. 1.

As illustrated in FIG. 3, the nut's forward axial face includes recesses 62 that receive respective drive dogs 64 (FIG. 2) extending from the inner surface of front sleeve 18. The angular width of the drive dogs is less than that of the recesses, resulting in a slight range of relative rotational movement, for example between 6° and 10° between the nut and the front sleeve.

Nut 16 also defines a plurality of grooves formed as flats 68 about the nut's outer circumference. Flats 68 receive respective tabs 70 extending forward from an inner race 72 of a bearing assembly 74. The engagement of tabs 70 and flats 68 rotationally fix the inner race to the nut, although it should be understood that there may be a slight rotational tolerance between the two.

Inner race 72 receives a plurality of bearing elements, in this case bearing balls 76, disposed between it and an outer race 78 seated on thrust ring ledge 50 (FIG. 1). Outer race 78 is rotationally fixed to body 14 by a plurality of tabs 80 received in corresponding grooves 82 in the thrust ring ledge. In an embodiment of the invention described herein, outer race 78 is not rotationally fixed with respect to the thrust ring, and tabs 80 and grooves 82 are therefore omitted. In such embodiment, outer race 78 can rotate with respect to the body until the jaws close onto a tool shank, at which point rearward force from the nut through the bearing gives rise to friction between outer race 78 and the thrust ring that holds the outer race in place rotationally on the body.

Returning to the prior art chuck in FIGS. 1 through 3, outer race 78 also includes a ratchet formed by a plurality of sawtooth-shaped teeth 84 disposed about the inner circumferential surface of the outer race. A first pawl 86 extends from one side of each tab 70. First pawl 86 is biased radially outward from the inner race, thereby urging a distal end 88 of each first pawl 86 towards the outer race ratchet.

Each tooth 84 has a first side with a slope approaching 90° with the periphery of the outer race. A second side of each tooth 84 has a lesser slope. First pawl 86 is deflectable and is generally disposed in alignment with the slope of the second side. Thus, rotation of inner race 72 in a closing direction 90 with respect to outer race 78 moves first pawl distal ends 88 repeatedly over teeth 84, causing a clicking sound each as end 88 falls against each subsequent tooth second side. This configuration of teeth and first pawls 86, however, prevents the inner race's rotation in an opposite opening direction 92. Application of rotational force to the inner race in this direction forces distal ends 88 into the steep-sloped first sides of teeth 84. Since pawl 86 is generally perpendicular to the first sides, it does not deflect inward to permit rotation. As discussed below, direction 90 corresponds to the chuck's closing direction, while direction 92 corresponds to the chuck's opening direction. Accordingly, when pawls 86 engage ratchet teeth 84, the teeth permit the inner race's movement in the chuck's closing direction 90 but prevent its movement in the opening direction 92.

A second deflectable pawl 94 extends from the other side of each tab 70. Like first pawls 86, each second pawl 94 is biased radially outward. Unlike first pawls 86, however, second pawls 94 do not engage the outer race ratchet.

Figure 4A:
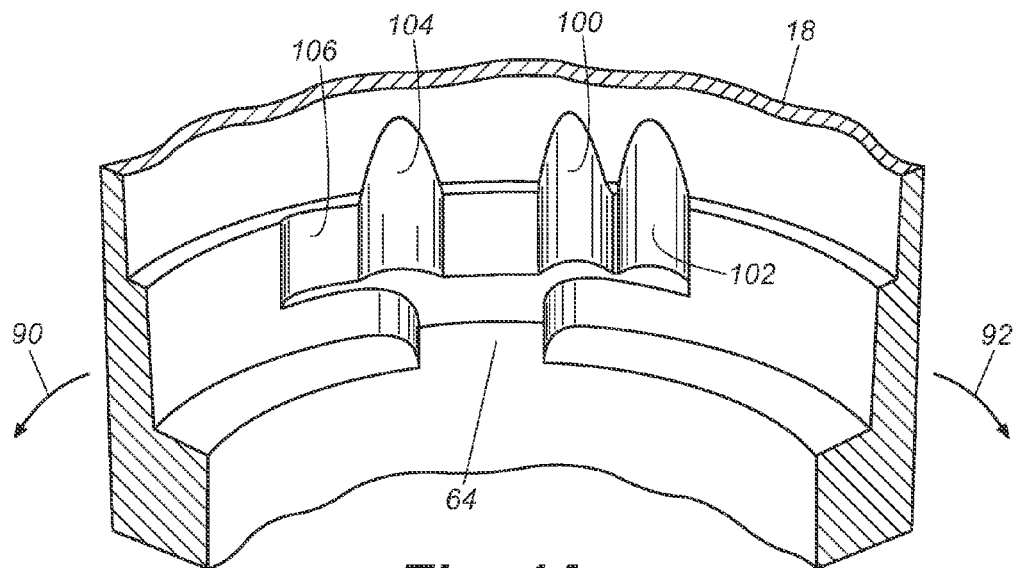
FIG. 4A is a partial perspective view of the sleeve of the chuck as shown in FIG. 1.

First and second pawls 86 and 94 include tabs 96 and 98, respectively, at their distal ends. Referring also to FIG. 4A, an inner circumferential surface of sleeve 18 defines first and second recesses 100 and 102. During the chuck's operation, each tab 98 is received in one of these recesses, depending on the sleeve's rotational position with respect to the nut as discussed in more detail below. The sleeve also defines a third recess 104 and a cam surface 106. Also depending on the sleeve's rotational position, each tab 96 is received either by the cam surface or by recess 104. The sleeve includes a pair of recesses 100, 102 for each tab 98 and a recess 104 and cam surface 106 for each tab 96.

Figure 4B:
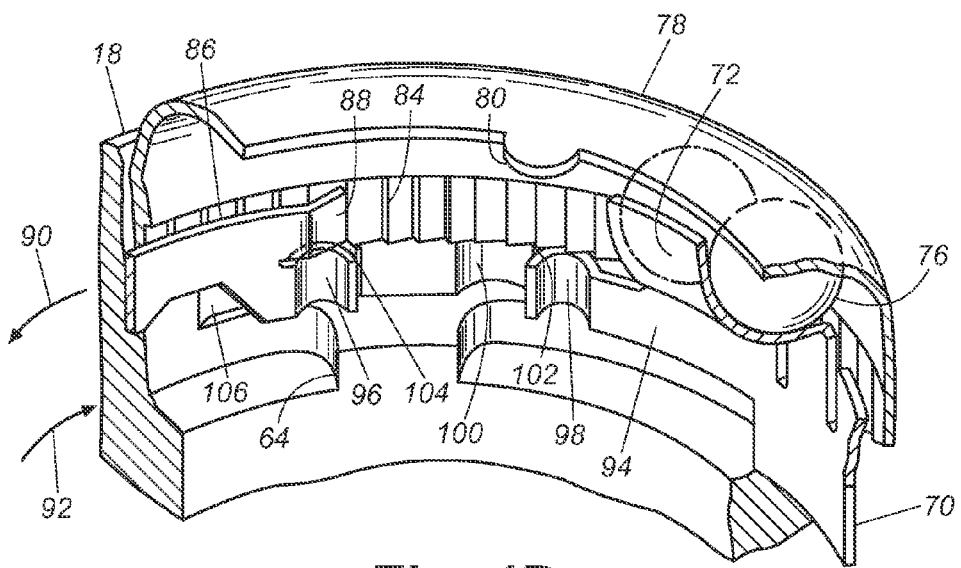
FIG. 4B is a partial perspective view of the bearing and sleeve of the chuck as shown in FIG. 1.
Figure 4C:
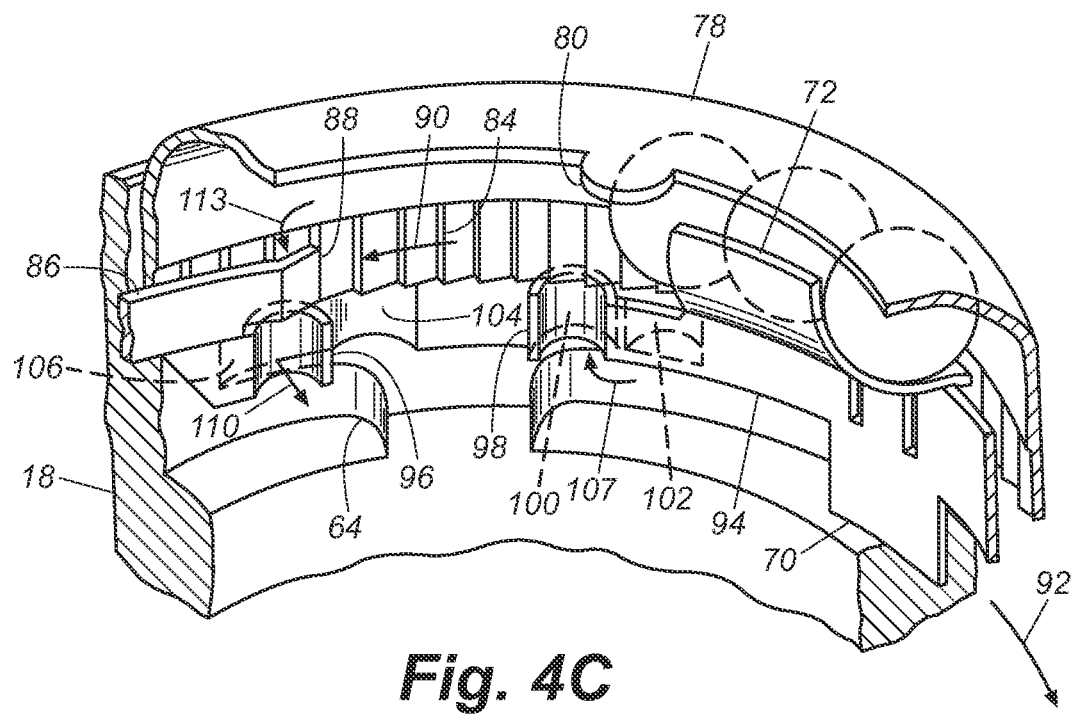
FIG. 4C is a partial perspective view of the bearing and sleeve of the chuck as shown in FIG. 1.

FIG. 4C illustrates the disposition of pawls 86 and 94 when sleeve 18 is in a first of two positions with respect to nut 16, while FIG. 4B illustrates these components when the sleeve is in a second position with respect to the nut. For ease of illustration, both figures omit the nut. However, referring to FIG. 2 and to the sleeve's second position as shown in FIG. 4B, each drive dog 64 is disposed against or adjacent to a side 108 of the gap 62 in which it is received. Each of the sleeve's recesses 102 receives a tab 98 of a second pawl 94, and each recess 104 receives a tab 96 of a first pawl 86. Accordingly, the distal end 88 of each first pawl 86 engages ratchet teeth 84, and inner race 72 can rotate only in direction 90 with respect to outer race 78.

Referring now to FIG. 4C, when front sleeve 18 moves in opening direction 92 with respect to outer race 78, each tab 98 moves out of its recess 102 and into its recess 100, as indicated by arrow 107. Each tab 96 rides up and out of its recess 104 onto its cam surface 106, as indicated by arrow 110. As indicated by arrow 113, this pushes each deflectable tab 86 radially inward, thereby disengaging distal ends 88 from ratchet teeth 84. Thus, the inner race is free to rotate with respect to the outer race.

As described in more detail below, when sleeve 18 rotates in opening direction 92 so that the inner race moves from the position shown in FIG. 4B to the position shown in FIG. 4C, drive dogs 64 move within groove 62 of nut 16 (FIG. 2) so that each drive dog is against or immediately adjacent to a side 111 of the groove.

In operation and referring to FIGS. 2, 3, 4B and 4C, when the chuck is between the fully opened and the fully closed positions, nut grooves 62 receive drive dogs 64 so that the drive dogs are adjacent groove sides 111. Inner race 72 is disposed with respect to outer race 78 so that tabs 96 and 98 are received by cam surface 106 and recess 100, respectively. That is, sleeve 18 is in the first position with respect to the nut, as shown in FIG. 4C. In this condition, tabs 98 and recesses 100 rotationally fix inner race 72 to sleeve 18. Since inner race 72 is rotationally fixed to nut 16 by tabs 70 and flats 68, an operator rotating sleeve 18 rotationally drives the nut through the bearing's inner race 72, thereby opening or closing the jaws. When the operator rotates the sleeve, the bearing inner race and the nut in the closing direction (indicated by arrow 90 in FIG. 4C) to the point that the jaws tighten onto a tool shank, the nut is urged rearward up the jaw threads, thereby pushing the nut against inner race 72, bearing elements 76, outer race 78, and thrust ring 46. The rearward force creates a frictional lock between the nut and inner race 72 that further holds the inner race and the nut in place rotationally with respect to the body.

The wedge between the nut threads and jaw threads increasingly resists the nut's rotation. When the operator continues to rotate sleeve 18 and the resistance overcomes the hold provided by tabs 98 in recesses 100, sleeve 18 rotates with respect to nut 16 and inner bearing race 72. This moves drive dogs 64 from sides 111 of grooves 62 to sides 108 and pushes tabs 98 out of recesses 100 into recesses 102. Simultaneously, cam surfaces 106 rotate away from tabs 96 so that the tabs are released into recesses 104, thereby engaging distal ends 88 of first pawls 86 with ratchet teeth 84, as shown in FIG. 4B. At this point, inner race 72, and therefore nut 16, is rotationally locked to outer race 78, and therefore body 14, against rotation in the chuck's opening direction. That is, the nut is rotationally locked to the chuck body in the opening direction. Since the nut's rotation with respect to the body is necessary to open the chuck, this prevents inadvertent opening during use.

Inner race 72, and therefore nut 16, may, however, still rotate with respect to outer race 78, and therefore body 14, in the chuck's closing direction. During such rotation, sleeve 18 drives nut 16 through drive dogs 64 against groove sides 108, as well as through inner race 72. This continues to tighten the chuck and as described above and produces a clicking sound to notify the operator that the chuck is in a fully tightened position.

To open the chuck, the operator rotates sleeve 18 in opening direction 92. Sleeve 18 transfers this torque to inner race 72 at the engagement of tabs 96 and 98 in recesses 104 and 102, respectively. Because pawls 86 engage outer race 78, which is rotationally fixed to the body, the inner race cannot rotate with the sleeve. Thus, upon application of sufficient torque in opening direction 92, sleeve 18 moves with respect to the inner race and the nut. This moves tab 96 back up onto cam surface 106, thereby disengaging first pawl 86 from ratchet teeth 84. Tab 98 moves from second recess 102 into first recess 100, and drive dogs 64 move from sides 108 to sides 111 of grooves 62. Thus, the sleeve moves to its first position with respect to the nut, as shown in FIG. 4C, and the inner race and nut are free to rotate with respect to the outer race and chuck body. Accordingly, further rotation of sleeve 18 in the opening direction moves jaws 22 away from the chuck axis, thereby opening the chuck.

The pawls and ratchet may be formed in any suitable configuration. Furthermore, the chuck may be realized in a variety of configurations whereby a bearing having a ratchet configuration is disposed between a sleeve, for example a nut or other suitable configuration, and the chuck body. For example, a chuck may include a body, a nut that is rotationally fixed to and axially movable with respect to the body, and an outer sleeve that threadedly engages the nut so that rotation of the sleeve moves the nut axially on the body. The jaws may be axially fixed to the nut and received in body passageways so that the nut's axial movement drives the jaws towards and away from the chuck's axis. In this configuration, an outer sleeve may be permitted to rotate over a limited angular distance with respect to a second sleeve. A bearing including a ratchet configuration as discussed above may be disposed between the second sleeve and the chuck body. Depending on the chuck's configuration, the pawls and ratchet may be interchanged as appropriate.

Figure 6:
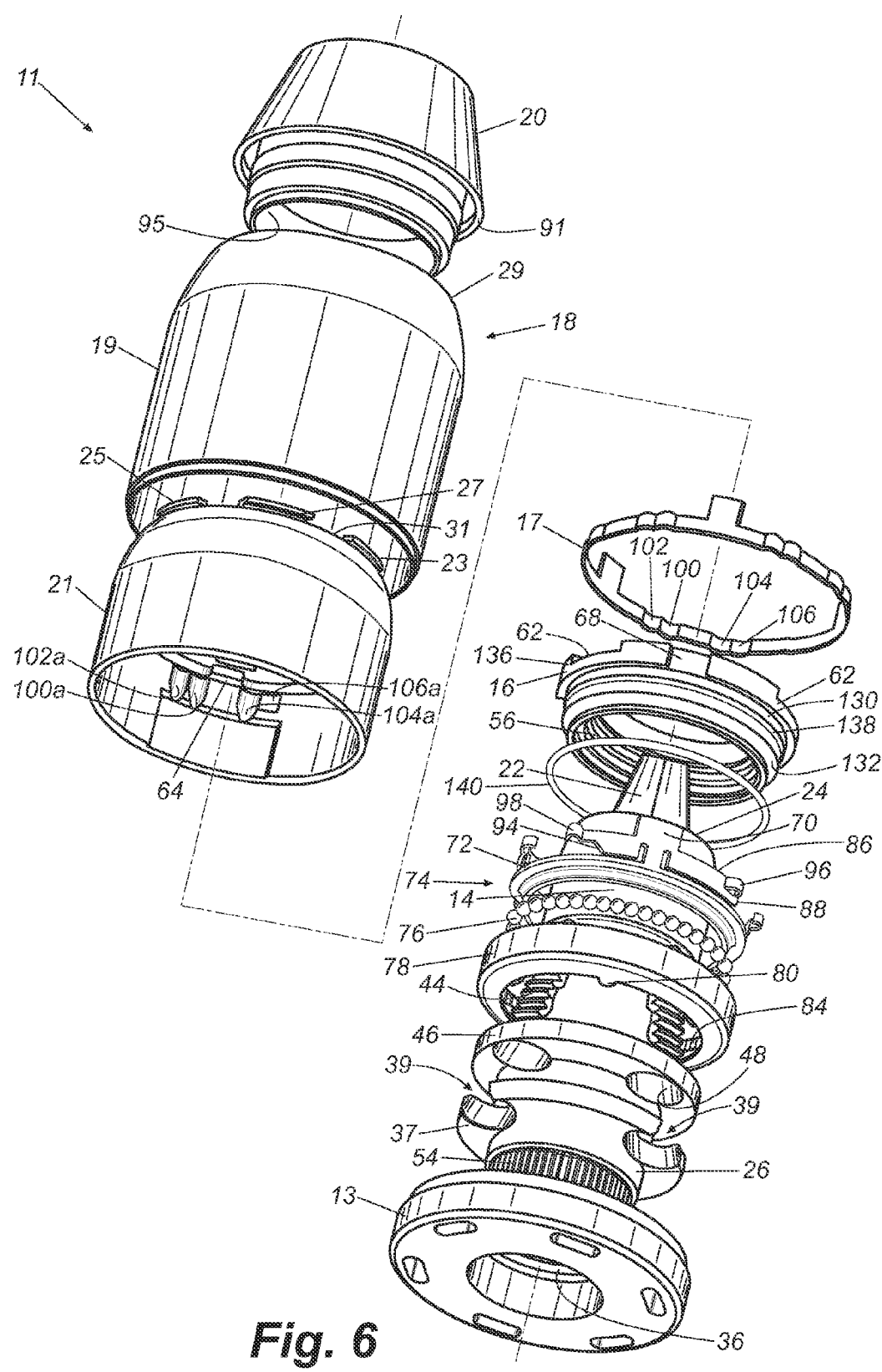
FIG. 6 is an exploded view of a chuck in accordance with an embodiment of the present invention.
Figure 7:
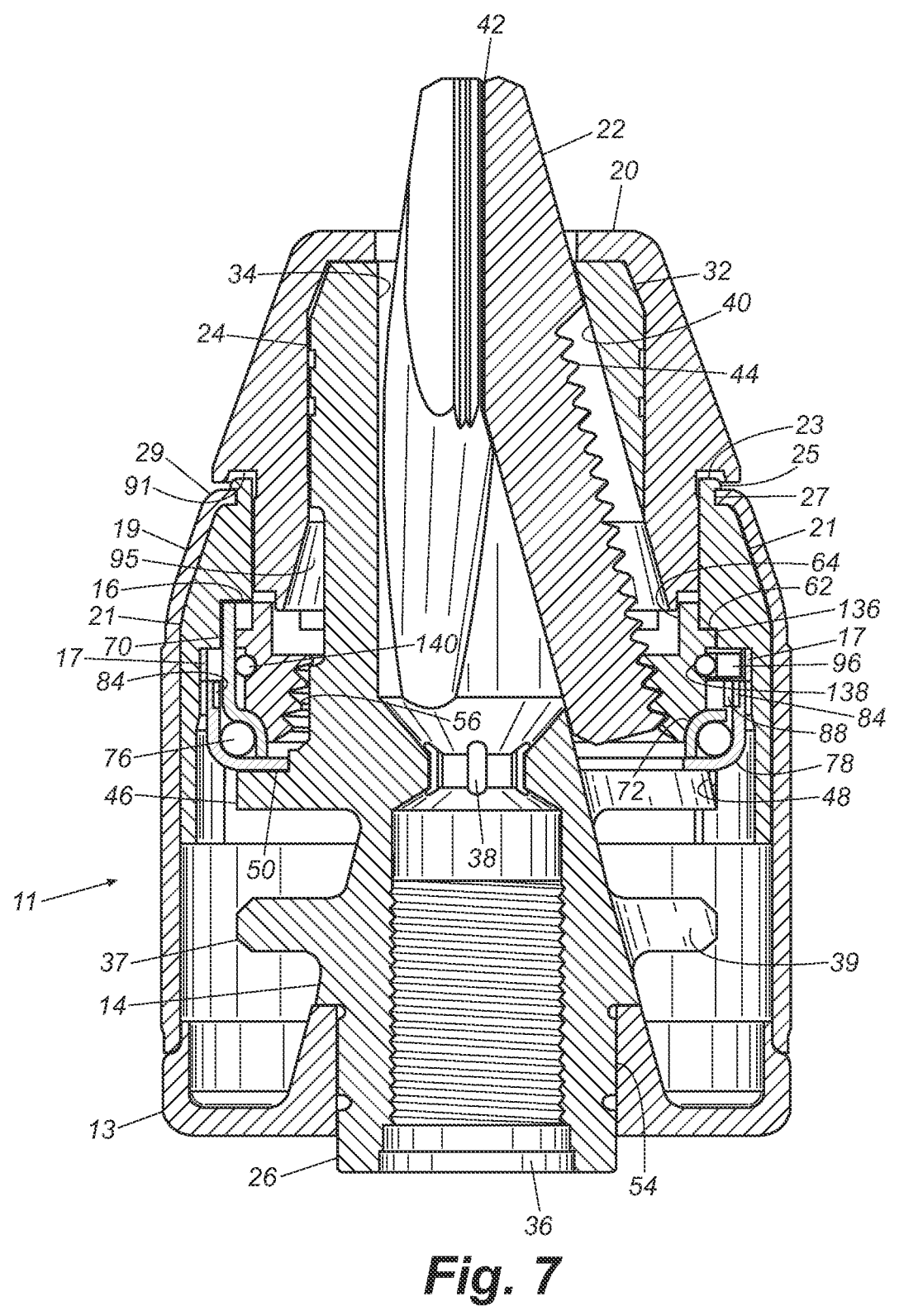

FIGS. 6 and 7 illustrate an embodiment of a chuck 11 of the present invention having a body 14, a nut 16, a front sleeve 18 (comprised of a metal outer part 19, a polymer inner part 21 and a metal insert 17), a nose piece 20 and a plurality of jaws 22. An embodiment shown in FIG. 8 has a front sleeve 18 comprised of a metal outer part 19 and a polymer inner part 21 without a metal insert. Body 14, which is constructed substantially the same as the body described above with respect to FIG. 2, is generally cylindrical in shape and comprises a nose or forward section 24 and a tail or rearward section 26. Nose section 24 has a forward end 32 that tapers from a smooth cylindrical outer circumference to a front face transverse to the longitudinal center axis of body 14. The nose section defines an axial bore 34 that is dimensioned somewhat larger than the largest tool shank the tool is designed to accommodate. A threaded bore 36 is formed in tail section 26 and is of a standard size to mate with the drive shaft of a powered or hand driver (not shown). Front bore 34 and rear bore 36 may communicate at a central region 38 of body 14. While a threaded bore 36 is illustrated, such bore could be replaced with a tapered bore of a standard size to mate with a tapered drive shaft. Furthermore, body 14 may be formed integrally with the drive shaft. A rear ring 37 is also formed integrally with body 14 and defines a plurality of guideways 39 to accommodate jaws 22 in their rearward positions.

Body 14 defines three passageways 40 to accommodate the three jaws. Each jaw is separated from the adjacent jaw by an arc of approximately 120°. The axes of the jaw passageways and jaws 22 are angled with respect to the chuck center axis such that each passageway axis travels through the forward axial bore in the body and intersects the chuck axis at a common point. The jaws form a grip that moves radially toward and away from the chuck axis to grip a tool, and each jaw 22 has a tool engaging face 42 generally parallel to the axis of chuck body 14. Threads 44, formed on each jaw's opposite or outer surface, may be constructed in any suitable type and pitch. As also indicated in FIG. 5, each jaw 22 may be formed with one or more carbide inserts 112 pressed into its tool engaging surface.

Figure 8:
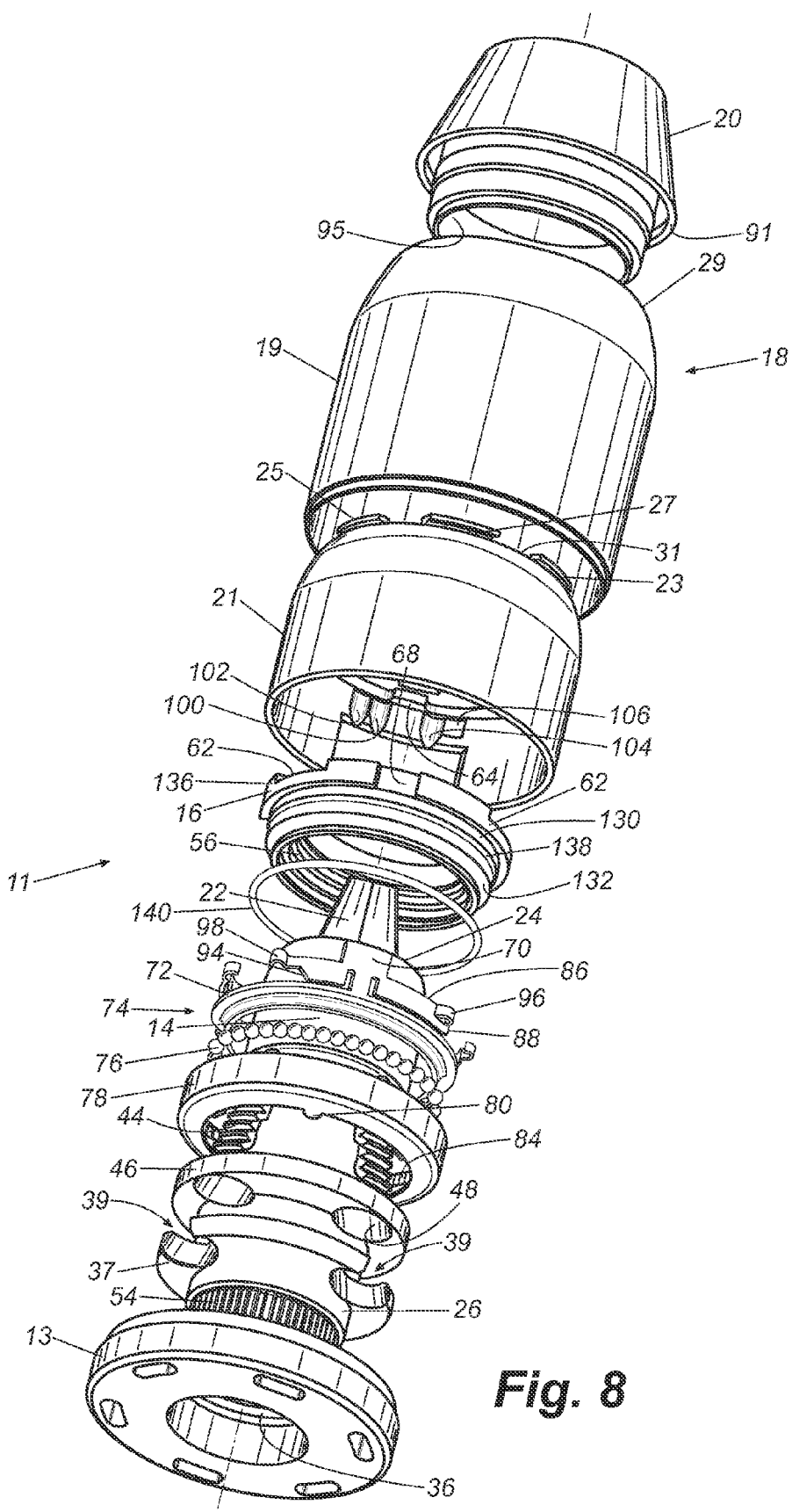
FIG. 8 is an exploded view of a chuck in accordance with an embodiment of the present invention.

As illustrated in FIGS. 6 through 8, body 14 includes a thrust ring 46 that, in a preferred embodiment, may be integral with the body. It should be understood, however, that thrust ring 46 and body 14 may be separate components. Thrust ring 46 includes a plurality of jaw guideways 48 formed around its circumference to permit retraction of jaws 22 therethrough and includes a ledge portion 50 to receive a bearing assembly as described below.

Body tail section 26 includes a knurled surface 54 that receives a dust cover 13 in a press fit. Dust cover 13 could also be retained by press fit without knurling, by use of a key or by crimping, staking, riveting, threading or any other suitable securing mechanism. Further, the chuck may be constructed with two hand-actuatable sleeves, as shown in FIGS. 1 and 2.

Nose piece 20 is press fit to body nose section 24 and retains nut 16 against forward axial movement. Nose piece 20 may be coated with a non-ferrous metallic coating to prevent rust and to enhance its appearance. Examples of suitable coatings include zinc or nickel, although it should be appreciated that any suitable coating could be utilized. It should also be understood that other methods of axially securing the nut on the body may be used. For example, the nut may be a two-piece nut held on the body within a circumferential groove on the body's outer circumference.

Front sleeve 18 is secured from movement in the forward axial direction by an annular shoulder 91 on nose piece 20. A frustoconical section 95 at the rearward end of the nose piece facilitates movement of jaws 22 within the chuck.

The outer circumferential surface of front sleeve outer part 19 may knurled or may be provided with longitudinal ribs or other protrusions to enable the operator to grip it securely. Outer front sleeve part 19 and metal insert 17 (FIGS. 6 and 7) may be deep drawn or otherwise fabricated from steel or other metal material such as Zamac (zinc aluminum metal alloy casting). The metal insert is preferably steel hardened to an HRC 43-51 Inner sleeve part 21 may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. Metal insert 17 may be pressed or otherwise assembled inside inner sleeve part 21 in close conformity so that the inner sleeve part retains the metal insert. In one preferred embodiment, inner sleeve part 21 is molded about the metal insert. As should be appreciated by one skilled in the art, the materials from which the chuck of the present invention is fabricated will depend upon the end use of the chuck, and the above materials are provided by way of example only.

Generally, the outer surface of inner part 21 conforms to the inner surface of outer part 19. However, polymer inner part 21 defines a plurality of flanges 23 that extend forward from the main portion of the inner sleeve part. Flanges 23 include front edges 25 that extend radially outward to thereby define a groove 27 between edges 25 and the front edge of the inner sleeve part's main portion. The segmented arrangement of flanges 23 allows the flanges to flex inward as the outer part is assembled over the inner part. A front edge 29 of outer sleeve part 19 extends radially inward and is notched to receive flanges 23. Thus, at the notches, front edge 29 extends radially inward into groove 27, while flanges 23 extend through the notches. Thus, groove 27 retains outer sleeve part 19 in the axially forward and rearward directions between the tabs' front edges 25 and the forward edge of the main portion of sleeve inner part 21. Sleeve outer part 19 rotationally drives sleeve inner part 21 through the interengagement of front edge 29 and flanges 23 and through a plurality of spaced-apart dogs (not shown) extending radially inward from the outer sleeve part's inner circumferential surface into corresponding notches 31 in the front outer surface of inner sleeve part 21. It should be understood that the two-part sleeve shown in FIGS. 6 through 8 may be replaced with a unitarily-formed polymer sleeve such as shown in FIGS. 1 and 2.

Nut 16 has threads 56 for mating with jaw threads 44 and is positioned about the body in engagement with the jaw threads so that when the nut is rotated with respect to body 14, the jaws will be advanced or retracted depending on the nut's rotational direction.

The nut's forward axial face includes recesses 62 that receive respective drive dogs 64 extending from the inner surface of inner sleeve part 21. Recesses 62 and drive dogs 64 are constructed as described above with respect to FIG. 2. Similarly, the inner surface of metal insert 17 (or, in the embodiment of FIG. 8, sleeve inner part 21) defines recesses 100, 102 and 104 and a cam surface 106 as is described above with respect to the inner surface of sleeve 18 in FIGS. 1 and 2. For the purpose of clarity, the positions of recesses 100, 102 and 104 and cam surface 106 in inner sleeve part 21 behind insert 17 are indicated in FIG. 6 as recesses 100a, 102a, and 104a, and cam surface 106a.

Nut 16 also defines a plurality of grooves, formed as flats 68 about the nut's outer circumference, that receive respective tabs 70 extending forward from an inner race 72 of a bearing assembly 74. The engagement of tabs 70 and flats 68 rotationally fix the inner race to the nut, although it should be understood that there may be a slight rotational tolerance between the two.

Inner race 72 receives a plurality of bearing elements, in this case bearing balls 76, disposed between it and an outer race 78 seated on thrust ring ledge 50. Outer race 78 is rotationally fixed to body 14 by a plurality of tabs 80 received in corresponding grooves 82 in the thrust ring ledge, as is described above with respect to FIGS. 1 and 2. In an alternate embodiment, outer race 78 is not rotationally fixed with respect to the thrust ring, and the tabs and grooves are therefore omitted. In such alternate embodiment, outer race 78 can rotate with respect to the body until the jaws close onto a tool shank, at which point rearward force from the nut through the bearing gives rise to friction between outer race 78 and thrust ring ledge 50 that ultimately holds the outer race in place rotationally on the body.

As discussed above with respect to outer race 78 in FIG. 2, outer races 78 in FIGS. 6 through 8 include a ratchet. In the illustrated embodiments, the ratchet is formed by a plurality of saw tooth-shaped teeth 84 disposed about the outer race's inner circumferential surface. A first pawl 86 extends from one side of each tab 70 and is biased radially outward from the inner race, thereby urging a distal end 88 of each first pawl 86 toward the outer race ratchet. Teeth 84 are formed, and interact with pawl distal end 88, as described above with respect to the corresponding components of FIGS. 1 through 4.

A second deflectable pawl 94 extends from the other side of each tab 70. Like first pawls 86, each second pawl 94 is biased radially outward. Unlike first pawls 86, second pawls 94 do not engage the outer race ratchet. Pawls 86 and 94 are constructed identically to pawls 86 and 94 as described above with respect to FIGS. 1 and 2. First and second pawls 86 and 94 include tabs 96 and 98, respectively, at their distal ends that interact with recesses 100, 102 and 104, and cam surface 106, in the same manner as described above. Moreover, the operation of the chucks shown in FIGS. 6 through 8, with respect to opening, closing and locking by the interaction of pawls 86 and 94 with the inner surface of sleeve 18 (more particularly, the inner surface of metal insert 17 in FIGS. 6 and 7 and inner sleeve part 21 in FIG. 8), is the same as the operation of chuck 10 shown in FIGS. 1 through 4, and is therefore not repeated.

In drill chuck 10 as shown in FIGS. 1 and 2, nut 16 defines a smooth cylindrical shoulder 130 extending in the axial direction between a curved surface 132 and a transverse annular shoulder 134 extending between shoulder 130 and an annular shoulder 136 upon which flats 68 are defined. In the embodiments of the present invention illustrated in FIGS. 6 through 8, a resilient structure is disposed between shoulder 130 and first and second pawls 86 and 94 in sufficient volume and/or geometry so that the resilient intermediate structure increases the pawls' radially outward bias to thereby dampen vibrations that arise from the chucks' usage with a given power driver and that otherwise tend to dislodge the pawls from their positions with respect to the outer race and sleeve, as shown in FIGS. 4B and 4C.

As shown in FIGS. 6 through 8, for example, a groove 138 is formed in shoulder 130 so that, when nut 16 is assembled onto body 14, groove 138 is defined in a plane perpendicular to the chuck axis and receives an O-ring 140. In one preferred embodiment, O-ring 140 is made of VITON, a fluoroelastomer manufactured by DuPont Dow Elastomers LLC of Wilmington, Del., and has an axial width of about 1/16 inches, an inner diameter of about 1.000 inches and an outer diameter of about 1.125 inches.

The diameter defined by shoulder 130 on either side of groove 138 is approximately 1.244 inches, while the diameter of a circle defined by the trough of groove 138 is approximately 1.200 inches. Thus, O-ring 140 stretches when installed into groove 138, and its outer diameter becomes approximately 1.325 inches. A radius defined from the axis of chuck body 14 to any of pawls 86 and 94 in their positions as shown in FIG. 4B is approximately 0.651 inches, corresponding to a diameter of 1.302 inches. First and second pawls 86 and 94 thereby compress O-ring 140, which, due to its resilience, responsively applies a radially outward force to the pawls. This radially outward force provides a secondary radially outward bias to the pawls that supplements the pawls' inherent radially outward bias and increases the pawls' tendency to remain seated in either of their two above-described positions during the power driver's operation. That is, O-ring 140 increases resistance to vibrational forces that may tend to push the pawls radially inward out of their respective grooves defined in the inner diameter of the sleeve, thereby inhibiting the chuck from opening or closing during use.

It will also be recognized that the increased radially outward bias increases the force necessary to be applied by the user in moving the sleeve between the locking mechanism's two operative positions. Thus, it should be understood that the materials and geometry of O-ring 140 may be selected to dampen vibrations in a power driver having a given power rating while still permitting effective manual operation by the user. For example, it is expected that a drill chuck as described above with respect to FIGS. 6 through 8 (where O-ring 140 has a Shore A hardness from 60 to 80 and where outer race 78 is rotationally fixed to body 14 by tabs 80 received in grooves 82 in the thrust ring) will resist vibrations generated by a model GSB 18-2 RE 750 watt AC impact drill, manufactured by BOSCH Tool Corporation of Farmington Hills, Mich., such that the chuck does not undesirably open or over tighten.

In another preferred embodiment, groove 138 is formed into shoulder 130 in a square cross section, and O-ring 140 is formed in a correspondingly square cross section. The dimensions of the nut and O-ring otherwise remain the same.

It should also be understood that various materials may be used to construct O-ring 140. For example, materials include various suitable elastomers such as acrylonitrile-butadiene (NBR, buna N, or nitrile rubber), chloroprene rubber (CR, or neoprene), polyacrilic rubber, silicone rubber, butyl rubber (ITR), styrene-butadiene (SBR, or buna S rubber), chlorosulfonated polyethelene (CSM, commercially available under the name HYPALON), or polysulfide rubber (T, or thiokol polymer) or thermoplastics such as suitable fluorocarbons (e.g. Teflon TFE or FEP), impact grade polystyrenes comprising polystyrene and rubber, and polyamide resins (nylon). O-rings made from commercially available materials such as the fluoroelastomers and perfluoroelastomers VITON, KALREZ, SIMRIZ, CHEMRAZ and AFLAS, and HYPALON (chlorosulfonated polyethylene), are available from Marco Rubber & Plastic Products, Inc. of North Andover, Mass.

The shape of O-ring 140 may vary as desired. For example, O-ring 140 maybe molded into a shape that conforms at its inner diameter to the outer surface of shoulder 130 (with or without a groove 138) and that conforms at its outer circumference to the surfaces of pawls 86 and 94 that face the nut. The molded O-ring is preferably made by compression molding and can be formed from any of the above-described materials suitable for compression or injection molding. The O-ring can be molded as a separate component or can be molded directly around the nut.

To determine whether a given dampening structure, whether an O-ring of a selected material and geometry or any other selected resilient device, will sufficiently dampen vibrations for a given chuck configuration on a given driver, the structure may be assembled on a chuck and tested with the driver. Referring to the drill chuck as shown in FIGS. 6 through 8, for example, the chuck may be assembled and operated with a drill bit shank so that jaws 22 securely grip the tool shank. An alignment mark is then made axially along the outer surface of sleeve 18, nose piece 20 and the tool shank so that the mark lies on the sleeve, nose piece and tool shank in a plane that includes the axis of chuck body 14. The driver/chuck/bit is then operated to drill holes in selected materials, for example steel, concrete, diorite and wood. A hammer function may be applied while drilling in concrete and diorite. After each hole is drilled, or after each of a certain number of holes is drilled, the alignment of the marks on the sleeve, nose piece and bit is checked to determine whether the chuck has undesirably opened or over tightened.

The construction of the pawls and ratchet teeth contribute to the resistance of the locking mechanism to vibrations and, consequently, to the degree to which a supplemental outward bias is desirable. For example, the depth of pawl teeth 84 constructed as described above contributes to the effectiveness of the primary outward bias and, in a preferred embodiment as shown in FIGS. 6 through 8, is approximately $14/1000$ inches. Further, pawls 86 and 94 are preferably constructed with sufficient stiffness so that when the inner and outer races are assembled together on the nut (but apart from the chuck body and jaws), and the nut and inner race are rotationally secured, at least an about 2 in-lb torque is required to ratchet pawl end 88 over teeth 84, and in a preferred embodiment, the torque required is within a range of about 2 to about 3 in-lbs. In the example described below in which an about 0.7 gram layer of RTV sealant is disposed between the nut and the pawls, the torque required to ratchet the pawl over the ratchet teeth is within a range of about 4 in-lbs to 5 in-lbs.

It should also be understood that mechanisms other than O-rings may be used to apply additional bias to the pawls. In another preferred embodiment, for example, groove 138 in shoulder 130 may be omitted, so that shoulder 130 has a smooth surface as in FIGS. 1 and 2, and a spring band is received over the shoulder. The spring band is comprised of a central annular ring that may fit loosely over or be pressed to shoulder 130. A number of spring arms extend outward from, and are biased radially away from, the central band. There is one spring arm for each pawl 86 and 94, and a distal end of each spring arm engages its corresponding pawl to thereby apply a supplemental radially outward bias to the pawl. Particularly where the spring band's central ring fits loosely about the nut, the distal end of each spring arm may define tabs shaped correspondingly to tabs 96 and 98 (see FIG. 3) so that the spring arm tabs are received in tabs 96 and 98 to thereby rotationally orient the spring band with respect to inner race 72.

In a further preferred embodiment, shoulder 130 is again smooth, and O-ring 140 is replaced by a layer of silicone RTV (room-temperature vulcanized) rubber, for example 732 multi-purpose silicone RTV sealant made by Dow Corning Corporation and available from IDG Corporation of Belmont, N.C. The RTV sealant may be applied manually or automatically. For a construction as shown in FIGS. 6 through 8, in which six pawls 86 and 94 are used, six nozzles may be arranged in a pattern so that when the nozzles are brought to a position proximate shoulder 130, the nozzles deposit dots of RTV sealant at positions on the shoulder corresponding to the opposing pawls.

In a preferred embodiment in which shoulder 130 defines a diameter of approximately 1.244 inches, a total of approximately 0.7 grams of RTV sealant is disposed on the shoulder. It should be understood, however, that the amount of RTV sealant may vary as desired, with the lower end of the desirable range being the point at which the RTV sealant fails to provide sufficient resilient force for a given chuck and driver, and the upper end of the desirable range being the point at which RTV sealant extends beyond an operative space between shoulder 130 and the pawls and thereby fails to contribute to the additional bias force. In the arrangement (with a smooth shoulder 130) as described above with respect to FIGS. 1 and 2, a range of 0.4 grams to 1.6 grams was found to be desirable. Using a chuck as in FIGS. 6 through 8 with the method described above, a 0.7 gram layer of RTV sealant was found to dampen vibrations in a model GSB 18-2 RE 750 watt AC impact drill and a model GSB 20-2 RCE 1010 watt AC impact drill manufactured by BOSCH Tool Corporation of Farmington Hills, Mich.

While one or more preferred embodiments of the present invention have been described above, it should be understood that any and all equivalent realizations of the present invention are included within the scope and spirit thereof. Thus, the depicted embodiments are presented by way of example only and are not intended as limitations on the present invention. It should be understood that aspects of the various one or more embodiments may be interchanged both in whole or in part. Therefore, it is contemplated that any and all such embodiments are included in the present invention as may be fall within the literal or equivalent scope of the present disclosure.

What is claimed is:

1. A chuck for use with a manual or powered driver having a rotatable drive shaft, the chuck comprising:
   a generally cylindrical body having a nose section and a tail section, the tail section being configured to rotate with the drive shaft and the nose section having an axial bore formed therein;
   a plurality of jaws movably disposed with respect to the body in communication with the axial bore;
   an annular nut having threads formed thereon in engagement with threads on the jaws so that rotation of the nut about the body moves the jaws toward or away from an axis of the axial bore;
   a sleeve having a first portion comprised of a polymer, the sleeve being rotatably mounted about the body in operative communication with the jaws so that rotation of the sleeve in a closing direction moves the jaws toward the axis and rotation of the sleeve in an opening direction moves the jaws away from the axis;
   a bearing having a first race adjacent the body, a second race adjacent the sleeve and at least one bearing element disposed between the first race and the second race, one of the first race and the second race defining a ratchet and the other of the first race and the second race defining a pawl biased toward the ratchet; and
   a metal cam portion defining a cam surface that is configured to selectively engage the pawl, the cam portion being non-rotatably fixed to an inner surface of the first portion of the sleeve and disposed radially outward of the nut such that the pawl is disposed radially inward of the cam portion, wherein the ratchet and the pawl are configured so that when the pawl engages the ratchet, the ratchet and pawl prevent the second race from rotating in the opening direction with respect to the first race, and wherein the first portion of the sleeve is disposed radially outward of the cam portion and entirely encloses the cam portion radially outward of the cam portion.

2. The chuck as in claim 1, wherein the sleeve further comprises a second portion comprised of a metal, the second portion being disposed radially outwardly of the first portion, and wherein the sleeve rotationally drives the nut but is movable with respect to the nut between a first position and a second position.

3. The chuck as in claim 1, wherein the pawl is deflectable and wherein the pawl and the ratchet are configured so that when the pawl is engaged with the ratchet, the pawl and ratchet permit the second race to rotate in the closing direction with respect to the first race but prevent the second race from rotating in the opening direction with respect to the first race.

4. The chuck as in claim 1, wherein the polymer of the first portion of the sleeve is comprised of one of a structural plastic, a polycarbonate and a filled polypropylene.

5. A chuck for use with a manual or powered driver having a rotatable drive shaft, the chuck comprising:
   a generally cylindrical body having a nose section and a tail section, the tail section being configured to rotate with the drive shaft and the nose section having an axial bore formed therein;
   a plurality of jaws movably disposed with respect to the body in communication with the axial bore;
   an annular nut having threads formed thereon in engagement with threads on the jaws so that rotation of the nut about the body moves the jaws toward or away from an axis of the axial bore;
   a sleeve rotatably mounted about the body in operative communication with the jaws so that rotation of the sleeve in a closing direction moves the jaws toward the axis and rotation of the sleeve in an opening direction moves the jaws away from the axis;
   a bearing disposed between the body and the nut;
   a ratchet non-rotatably fixed to the body;
   a first pawl non-rotatably fixed to the nut, the first pawl being movable between a first position in which it engages the ratchet and a second position in which it is disengaged from the ratchet; and
   a cam portion comprised of metal and defining a cam surface that is configured to selectively engage the first pawl, the cam portion being non-rotatably fixed to an inner surface of the sleeve,
   wherein the ratchet and the first pawl are configured so that when the first pawl engages the ratchet, the ratchet and first pawl prevent the nut from rotating in the opening direction with respect to the body, and
   wherein a first portion of the sleeve is disposed radially outward of the cam portion and entirely encloses the cam portion radially outward of the cam portion.

6. The chuck as in claim 5, wherein the first pawl is disposed radially inwardly of the cam portion.

7. The chuck as in claim 5, wherein the sleeve rotationally drives the nut and is movable with respect to the nut between a first position and a second position.

8. The chuck as in claim 7, wherein the cam portion is disposed with respect to the first pawl so that the cam surface is engaged with the first pawl when the sleeve is in the first position with respect to the nut and disengaged from the first pawl when the sleeve is in the second position with respect to the nut.

9. The chuck as in claim 7, further comprising a second deflectable pawl, wherein the second pawl is biased toward an inner surface of the cam portion and wherein the inner surface defines a first recess and a second recess disposed with respect to the nut so that the second pawl is received by the first recess when the sleeve is in the first position and so that the second pawl is received by the second recess when the sleeve is in the second position.

10. The chuck as in claim 5, wherein the first pawl is deflectable and wherein the first pawl and the ratchet are configured so that when the first pawl is engaged with the ratchet, the first pawl and ratchet permit the nut to rotate in the closing direction with respect to the body but prevent the nut from rotating in the opening direction with respect to the body.

11. The chuck as in claim 5, wherein the sleeve is comprised of a polymer.

12. The chuck as in claim 5, wherein the cam portion further comprises a ring disposed about the body of the chuck.

13. The chuck as in claim 5, further comprising a biasing element configured to bias the first pawl toward the ratchet.

14. The chuck as in claim 13, wherein the biasing element further comprises an O-ring.

15. A chuck for use with a manual or powered driver having a rotatable drive shaft, the chuck comprising:
   a generally cylindrical body having a nose section and a tail section, the tail section being configured to rotate with the drive shaft and the nose section having an axial bore formed therein;
   a plurality of jaws movably disposed with respect to the body in communication with the axial bore;
   an annular nut having threads formed thereon in engagement with threads on the jaws so that rotation of the nut about the body moves the jaws toward or away from an axis of the axial bore;
   a sleeve rotatably mounted about the body in operative communication with the jaws so that rotation of the sleeve in a closing direction moves the jaws toward the axis of the axial bore and rotation of the sleeve in an opening direction moves the jaws away from the axis;
   a ratchet non-rotatably fixed to the body; and
   a first pawl being non-rotatably fixed to the nut and selectively engageable with the ratchet,
   wherein the sleeve comprises a polymer portion and comprises a cam portion comprised of metal and defining a cam surface, the cam portion being non-rotatably fixed to an inner surface of the polymer portion so that the cam portion opposes the first pawl,
   wherein the sleeve is rotatable over a limited arc with respect to the nut between a first position in which the cam surface engages the first pawl and a second position in which the cam surface is offset with respect to the first pawl from a position of the cam surface with respect to the first pawl when the sleeve is in its first position,
   wherein the first pawl engages the ratchet in one of the first position and the second position of the sleeve and is disengaged from the ratchet in the other of the first position and the second position of the sleeve,
   wherein the ratchet and the first pawl are configured so that when the first pawl engages the ratchet, the ratchet and first pawl prevent the nut from rotating in the opening direction with respect to the body, and wherein the polymer portion is disposed radially outward of the cam surface and entirely encloses the cam surface radially outward of the cam portion.

16. The chuck as in claim 15, wherein the cam portion further comprises a ring disposed about the body of the chuck.

17. The chuck as in claim 15, further comprising a bearing disposed between the body and the nut.

18. The chuck as in claim 15, wherein the cam portion is disposed with respect to the first pawl so that the cam surface is engaged with the first pawl when the sleeve is in the first position with respect to the nut and offset from the first pawl when the sleeve is in the second position with respect to the nut.

19. The chuck as in claim 15, further comprising a second deflectable pawl that is non-rotatably fixed to the nut, wherein the second pawl is biased toward an inner surface of the cam portion and wherein the inner surface defines a first recess and a second recess disposed with respect to the nut so that the second pawl is received by the first recess when the sleeve is in the first position and so that the second pawl is received by the second recess when the sleeve is in the second position.

20. The chuck as in claim 15, wherein the first pawl is deflectable and wherein the first pawl and the ratchet are configured so that when the first pawl is engaged with the ratchet, the first pawl and ratchet permit the nut to rotate in the closing direction with respect to the body but prevent the nut from rotating in the opening direction with respect to the body.

21. The chuck as in claim 15, further comprising a biasing element configured to bias the first pawl toward the ratchet.

* * * * *